Sept. 8, 1942.  C. C. BLACK  2,295,329
AGRICULTURAL IMPLEMENT
Filed April 12, 1940  2 Sheets-Sheet 2
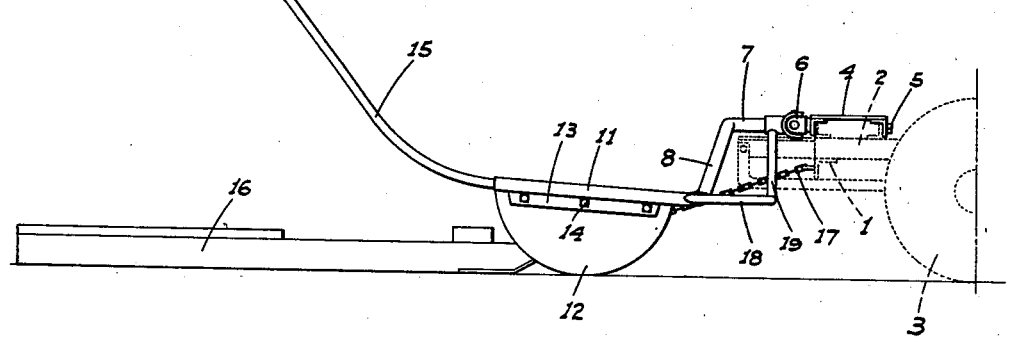
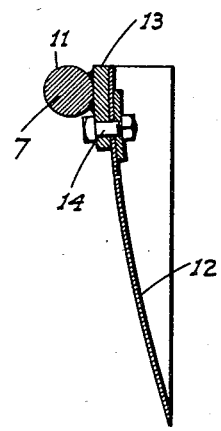
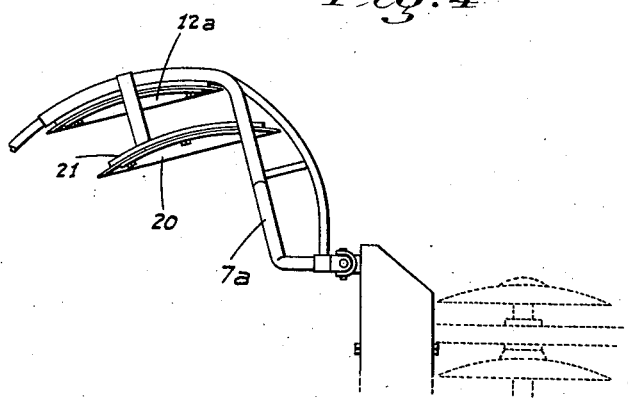
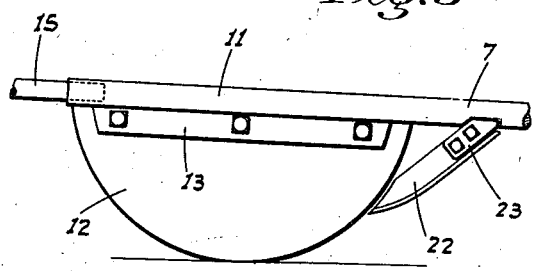
INVENTOR
C. C. Black
BY
ATTORNEYS Patented Sept. 8, 1942

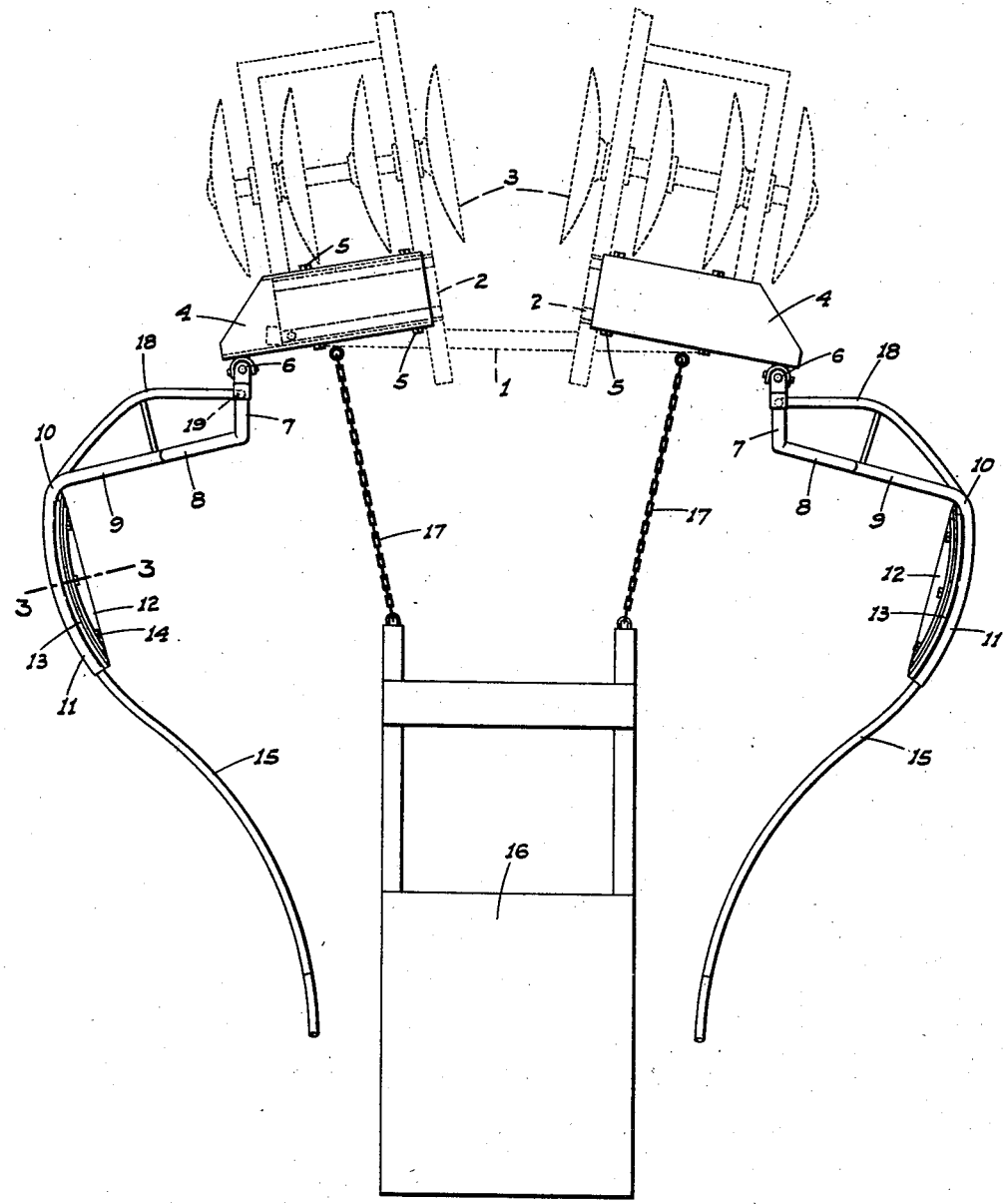

2,295,329

UNITED STATES PATENT OFFICE 2,295,329

AGRICULTURAL IMPLEMENT

Charles C. Black, Acampo, Calif.

Application April 12, 1940, Serial No. 329,295

2 Claims. (Cl. 97—179)

This invention relates to attachments for vineyard cultivators, which must have a total width considerably less than the spacing of the vines, so as to avoid possibly cutting the roots.

This, however, leaves uncultivated strips adjacent the vines, and it is therefore my principal object to provide cultivating attachment units, adapted for ready connection to the cultivator by means of which such strips, on both sides of the cultivator, may be simultaneously cultivated.

A further object is to arrange and mount the units, and the ground engaging elements thereon so that there is no danger of low growing branches being struck, and so that the elements may readily yield upwardly as well as horizontally if they encounter a relatively rigid obstruction, such as a thick root whose cutting might seriously injure if not kill the vine.

The attachment units are intended to be hand controlled, and another object is to arrange means whereby the units may be conveniently manipulated and guided and their work and operation observed, by an operator traveling with and behind the cultivator. The above features of construction and operation enable the tractor to be operated in high gear and at full speed if desired without danger of any vines being damaged.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a plan view of my cultivator attachment units as applied to a conventional disc cultivator.

Figure 2 is a side elevation of the same.

Figure 3 is an enlarged fragmentary cross section on line 3—3 of Fig. 1.

Figure 4 is a fragmentary plan view showing a modified form of attachment unit.

Figure 5 is an enlarged fragmentary side view of a cultivating blade, showing a grass or weed cutting knife mounted in connection therewith.

Referring now more particularly to the characters of reference on the drawings, the cultivator with which the attachments are used may be of any standard type and as here shown includes a rear frame bar 1 on which are swivelly mounted the head frames 2 from which the gangs of discs 3 are supported. The distance between the outermost discs, when angled for operation, is considerably less than the spacing between the vines of adjacent rows between which the cultivator is operating.

The attachment cultivator units, of which there are ordinarily two, are disposed on opposite sides of the cultivator and project rearwardly therefrom as shown in Fig. 1, and since these units are duplicates of each other (except that they are of course made right and left hand) a detailed description of but one of such units will suffice.

Each unit includes a supporting frame 4 slidably mounted for lateral adjustment on the transversely extending rails of the adjacent head frame 2, and held against undesired movement by bolts 5 between said rails and the frame 4.

A universal joint 6 is mounted on the rear face of frame 4 and is the mounting means for the supporting and manipulating bar 7 of the cultivating blade of the attachment. This bar at its forward end is connected to and extends directly rearward from joint 6 a short distance, and is then deflected down and laterally away from the central plane of the cultivator as at 8 to a level a predetermined distance above the bottom level of discs 3. The bar then extends farther in the same lateral direction some distance and at said level as at 9. The bar is then bent rearwardly somewhat abruptly as at 10, the bend being followed by a horizontally straight portion 11 substantially the length of the blade 12, this portion forming the termination of bar 7. This blade, which is of substantially semicircular form and may be conveniently made by cutting a cultivator disc in half, abuts along its upper edge against a mounting plate 13 secured on and depending from the inner face of bar portion 11; the blade being removably secured against said plate by bolts 14. Since the outer face of the blade is convex along its upper edge, the plate 13 and bar portion 11 are similarly curved as shown.

A handle bar 15 projects rearwardly from bar 7 with a combined curvature in a laterally inward and upward direction. The handle bars of both units are so shaped and disposed that they are conveniently placed at their upper end for grasping and manipulation by an operator standing on a supporting sled 16 disposed centrally of the cultivator behind the same and attached to the frame thereof by draft chains 17 or the like.

By reason of the above construction and arrangement, it will be seen that by swinging either handle bar laterally in one direction or the other, the corresponding blade 12, whose setting is approximately parallel to the discs 3, may be disposed to cultivate close to the vines, and one operator can easily work both attachments.

Owing to the curved form of the blade and to the fact that the joint 6 permits of upward movement of the blade, it will move upwardly and over any obstruction which it may encounter without damage to said obstruction or to the blade.

By reason of the lateral adjustability of the unit supporting frame 4, the spacing of the units relative to each other and to the cultivator may be altered as vine spacings may require.

Owing to the somewhat small height of the blade and the corresponding low level above ground of the adjacent portion of the supporting bar, there is no danger of any low growing branches on the vines being struck and damaged.

In order to deflect any such low growth from possibly coming in contact with the front edge of the blade and the adjacent lateral portions of bar 7, a horizontally arched deflector bar 18 extends laterally inward and ahead of said portions from a smooth junction with the bar 7 at bend 10 and on a level with bar portion 11, to a point directly under bar 7 adjacent the joint 6, being connected to said bar adjacent the joint by an upright 19. This also forms a truss to brace the adjacent portions of bar 7 against deflection.

Although in Figs. 1 and 2 I show a single cultivator blade on each unit, an additional blade 20 may be used as shown in Fig. 4. In this case, the additional blade is disposed laterally inward from and somewhat ahead of the main blade 12a and is supported from a back plate 21 mounted rigid with the main supporting bar 7a. The construction of this form of unit is otherwise substantially the same as the type first described.

Also if desired, a knife 22 may be removably mounted on a bracket 23 on bar 7 just ahead of the blade 12, this knife being substantially alined with the blade and having a downward slope to the rear along its forward cutting edge. This knife is useful to cut through Bermuda grass and similar weed growths which are sometimes encountered around the base of the vines.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A cultivating attachment for a cultivator having a rear frame, said attachment comprising a flexible joint adapted to be secured on said frame, a relatively low cultivating blade disposed laterally out from and rearwardly of the joint and below the same, a supporting bar for the blade comprising a substantially horizontal portion on which the blade is mounted, a portion extending laterally inward from in front of the blade and up substantially to the level of the joint and a top portion connected to the joint; and an operating bar rigid with and projecting rearwardly from the supporting bar.

2. A cultivating attachment for a cultivator having a rear frame, said attachment comprising a flexible joint adapted to be secured on said frame, a supporting bar comprising a substantially horizontal portion disposed rearwardly of, below and laterally out from the joint, a portion extending laterally in from the forward end of said horizontal portion and up substantially to the level of the joint and a top portion connected to the joint; a blade secured on and depending from said horizontal portion of the bar, an operating bar rigid with and projecting rearwardly from the supporting bar, a deflector bar extending forwardly and laterally inward from the blade mounting portion of the supporting bar substantially on a level with said portion to a termination below the joint end of said supporting bar, and an upright connecting and extending between said termination of the deflector bar and the supporting bar above.

CHARLES C. BLACK.